United States Patent
Shi

(10) Patent No.: US 8,185,157 B2
(45) Date of Patent: May 22, 2012

(54) METHOD OF DEALING WITH BUSINESS CONFLICT OF DUAL-CARD-DUAL-STANDBY MOBILE PHONE

(75) Inventor: Feng Shi, Shanghai (CN)

(73) Assignee: Spreadtrum Communications (Shanghai) Co., Ltd., Pudong District, Shanghai (CN)

( * ) Notice: Subject to any disclaimer, the term of this patent is extended or adjusted under 35 U.S.C. 154(b) by 684 days.

(21) Appl. No.: 12/334,444

(22) Filed: Dec. 13, 2008

(65) Prior Publication Data

US 2009/0156256 A1  Jun. 18, 2009

(30) Foreign Application Priority Data

Dec. 13, 2007  (CN) .......................... 2007 1 0172208

(51) Int. Cl.
*H04M 1/00* (2006.01)
*H04B 1/38* (2006.01)
(52) U.S. Cl. ........................................ 455/558; 455/551
(58) Field of Classification Search .................. 455/551, 455/558, 552.1, 432.1, 435.1, 435.2, 435.3, 455/432, 435; 370/329, 389, 208.1
See application file for complete search history.

(56) References Cited

U.S. PATENT DOCUMENTS

| | | | |
|---|---|---|---|
| 6,175,621 B1 * | 1/2001 | Begeja ..................... | 379/208.01 |
| 7,046,643 B1 * | 5/2006 | Zellner et al. ................ | 370/329 |
| 2004/0125800 A1 * | 7/2004 | Zellner ......................... | 370/389 |
| 2006/0234693 A1 * | 10/2006 | Isidore et al. ............... | 455/422.1 |

* cited by examiner

*Primary Examiner* — Jean B Jeanglaude

(57) ABSTRACT

A method of dealing with business conflict of a dual-card-dual-standby mobile phone includes the steps as follows. Calculate the period of the periodic location update of the main card and subordinate card respectively, and reset a new period of the periodic location update. Comparing to the original period of the periodic location update, the new period of the periodic location update is reduced by twice of a time for the mobile phone to do the location update. Thus, when the first location update is delayed due to the terminating call, it still has time for the second location update. Set priority level for each conflicting services, so as to avoid the service conflict, such as the conflict between the originating and terminating call and the location update, and the conflict between the location update of main card and subordinate card.

7 Claims, 1 Drawing Sheet

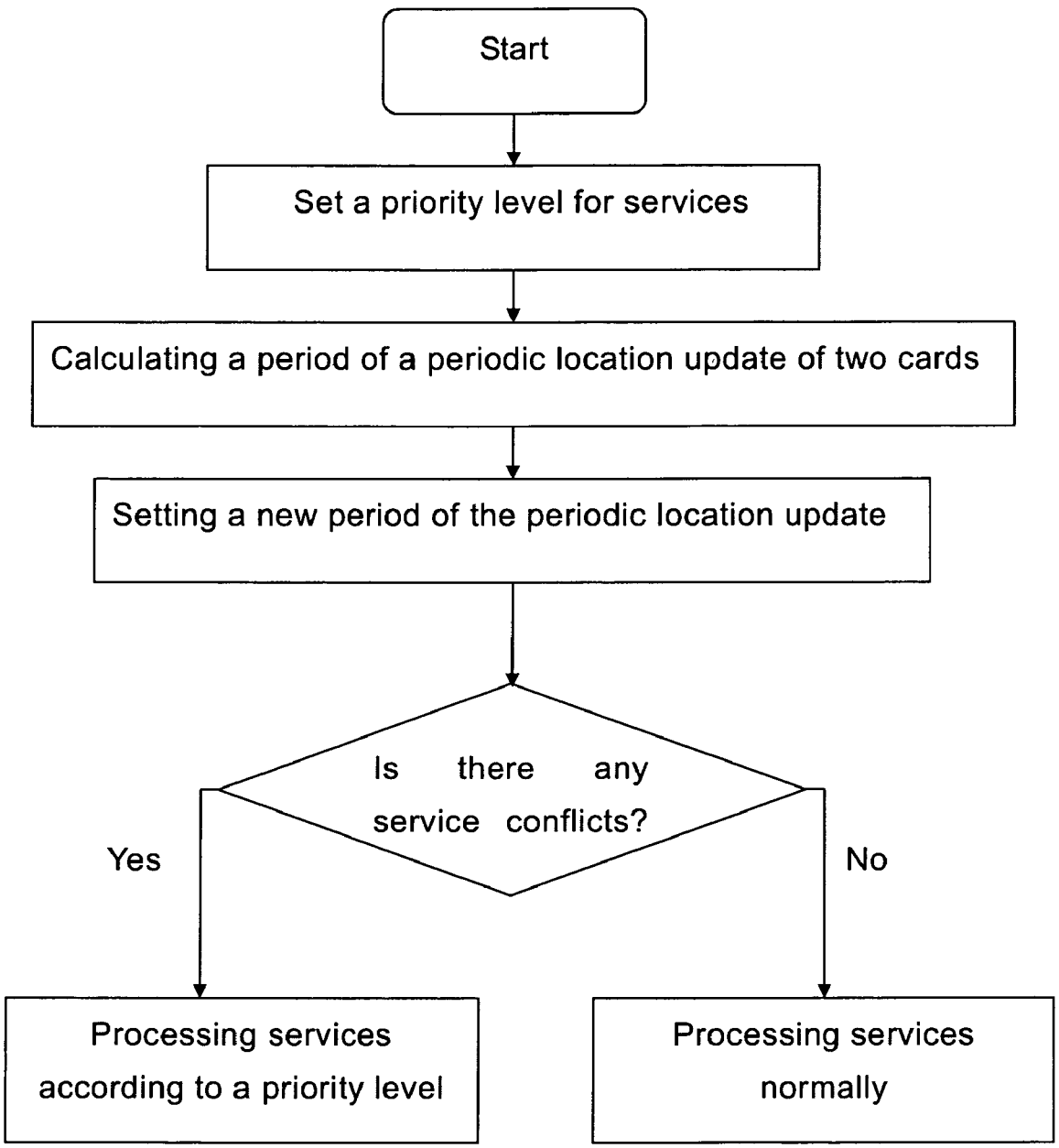

METHOD OF DEALING WITH BUSINESS CONFLICT OF DUAL-CARD-DUAL-STANDBY MOBILE PHONE

BACKGROUND OF THE INVENTION

1. Field of Invention

The present invention relates to a wireless telecommunication area, and more specifically to a method of dealing with service conflict of single-chip dual-card-dual-standby mobile phone.

2. Description of Related Arts

Any discussion of the prior art throughout the specification should in no way be considered as an admission that such prior art is widely known or forms part of common general knowledge in the field.

Wireless telecommunication industry developed very fast driven by the technology, market and mobile services. The mobile telecommunication devices have become a necessary part of daily life. With the increasing demand for mobile telecommunication service, many persons need two mobile phones at the same time. For example, in order to save the expensive roaming fee, the persons who usually work at different cities may need different local SIM cards at different cities respectively, so that they can user local SIM card at every city. However, changing SIM card frequently or bringing two mobile phones are very troublesome. Therefore, a dual-card-dual-standby mobile phone has been developed.

A US patent application US20060234693 discloses a single mobile phone supporting different subscriber numbers, having two SIM ports, sharing DSP and application processor and connecting to two RF modules respectively through one switching circuit. However, such mobile phone can only support two subscriber numbers respectively, and can not satisfy the demand of dual-card-dual-standby.

The current dual-card-dual-standby mobile phone usually uses two chipsets. For example, a Chinese patent application CN20061015647.0 discloses a technique scheme of two SIM cards serving at standby mode at the same time, wherein a dual-card-dual standby mobile phone includes a main device comprising a main SIM card port, a corresponding main antenna, a RF module and a baseband processing module, and an subordinate device having an subordinate SIM card port, an subordinate RF module and a subordinate baseband processing module, wherein the main baseband processing module communicates with the subordinate baseband processing module via a communication module. As shown in FIG. 1, the main device and the subordinate device use their own baseband processing module respectively, which results in high cost and large size of the dual-card-dual-standby mobile phone.

Therefore, a dual-card-dual-standby mobile phone with a single chipset is developed. A dual-card-dual-standby mobile phone with a single chipset adopts one set of antenna, RF module and baseband processing chip and other peripheral devices. In order to make sure that two SIM cards camp in their own cell respectively at the same time, the single RF chip has to be able to receive the system messages and paging messages from two carriers periodically. However, no matter whether the two carriers belong to the same operator or different operators, a single RF chip receiving two carriers has not been considered in designing the GSM network, especially in case of the two carriers belonging to different operators. Therefore, the system messages and the paging messages of two carriers may conflict with each other, so as to produce many business conflicts, such as the conflict between the originating call service and the terminating call service, the conflict between the originating call service and

BRIEF SUMMARY OF THE INVENTION

The present invention provides a method of dealing with business conflict of a dual-card-dual-standby mobile phone.

The present invention discloses a method of dealing with business conflict of a dual-card-dual-standby mobile phone comprising a set of antenna, RF module, baseband processing chip, comprising steps of:
(a) setting a priority level for services;
(b) calculating a period of a periodic location update of a maid card and a subordinate card;
(c) setting a new period of the periodic location update;
(d) processing the services according to the priority level of the services.

Firstly, set priority level for each conflicting services. When there is service conflict, process the services according to the priority level.

Calculate the period of the periodic location update of the main card and subordinate card respectively, and reset a new period of the periodic location update. Comparing to the original period of the periodic location update, the new period of the periodic location update is reduced by twice of a time for the mobile phone to do the location update. Thus, when the first location update is delayed due to the terminating call, it still has time for the second location update.

When the terminating call conflicts with the location update after cell reselection, process the terminating call firstly, buffer the location update, and process the location update until the terminating call ends.

When the terminating call conflicts with the periodic location update, process the terminating call firstly, because the period adjustment of the periodic location update can assure the update processed in time.

When the location update after cell reselection conflicts with the periodic location update, process the location update after cell reselection firstly and then the periodic location update.

When the location update after cell reselection conflicts with the originating call, process the location updated firstly, buffer the request of the originating call, and originate a random access request until the location update ends.

When the periodic location update conflicts with the originating call, process the location update firstly, buffer the request of the originating call, and originate a random access request until the location update ends.

BRIEF DESCRIPTION OF THE DRAWINGS

FIG. 1 is a flow chart of a method of dealing with the service conflict according to a preferred embodiment of the present invention.

DETAILED DESCRIPTION OF THE INVENTION

The present invention provide a method for avoiding service conflict of a single-chip dual-card-dual-standby mobile phone, which comprises an antenna, a RF module, a base band processing chip and other peripheral devices. In order to make sure that two SIM cards camp in their own cell respectively at the same time, the single RF chip has to be able to receive the system messages and paging messages from two carriers periodically. However, no matter whether the two carriers belong to the same operator or different operators, a single RF chip receiving two carriers has not been considered in designing the GSM network, especially in case of the two carriers belonging to different operators. Therefore, the system messages and the paging messages of two carriers may conflict with each other.

Therefore, set different priority levels for the services of the main card and subordinate card. When there is conflict between the services, a priority order is arranged so as to assure the process of the services. Usually, the service conflicts includes the conflicts between terminating call service, routing area update after cell reselection, periodic routing area update, originating call service. In order to deal with these conflicts, set a priority level between the services as follows: terminating call service→routing area update after cell reselection→periodic routing area update→originating call service.

Referring to the flow chart of FIG. 1, firstly, calculate the period of the periodic location update of the main card and subordinate card. The period of the periodic location update of the two cards is related to the camped cell and can be calculated according to the parameters of the system message. Reset a new period of the periodic location update. Assuming it takes $\Delta t$ for the mobile phone to process the location update, the original period of the periodic location update is T1, and the new period of the periodic location update is T2, T2=T1−2 $\Delta t$.

The new period of the periodic location update is shorter than the original period of the periodic location update. The shortened time is no less than 2 $\Delta t$. It usually takes 5 seconds for the mobile phone to process the periodic location update, so that the new period of the periodic location update can be set to a value 10 seconds shorter than the original period. When the location update conflicts with the short message and the location update of other cards, it still has 5 seconds to try again. For example, the period of the periodic location update required by the network is 30 minutes. We reduce the period by 5 seconds. We try to do the location update at the time of 29 minutes and 50 seconds, which takes about 5 seconds. If there is no conflict, the process ends. If there is conflict with the short message or location update of other card, we can try another time 5 seconds later so as to finish the periodic location update in 30 minutes.

After setting the new period of the location update, process the services according to the priority level when there are service conflicts.

When the terminating call conflicts with the location update after cell reselection, process the terminating call firstly and process the location update until the terminating call ends.

When the terminating call conflicts with the periodic location update, process the terminating call firstly, because the period adjustment of the periodic location update can assure the timely update.

When the location update after cell reselection conflicts with the periodic location update, process the location update after cell reselection firstly and then the periodic location update.

When the location update after cell reselection conflicts with the originating call, process the location updated firstly, buffer the request of the originating call, and originate a random access request until the location update ends. This will delay the originating call for 4 to 5 seconds.

When the periodic location update conflicts with the originating call, process the location update firstly, buffer the request of the originating call, and originate a random access request until the location update ends. This will delay the originating call for 4 to 5 seconds.

One skilled in the art will understand that the embodiment of the present invention as shown in the drawings and described above is exemplary only and not intended to be limiting. Any variation on the theme and methodology of accomplishing the same that are not described herein would be considered under the scope of the present invention.

What is claimed is:

1. A method of dealing with service conflicts of a single-chipset dual-card-dual-standby mobile phone, wherein the single-chipset dual-card-dual-standby mobile phone simultaneously supports two cards to receive and transmit signals, and comprises an antenna, a radio frequency (RF) module, and a baseband processing chip, wherein the method comprising the steps of:
   (A) setting a priority level for services;
   (B) according to parameters broadcasted by a system message, calculating an original period of a periodic location update of a main card and an original period of a periodic location update of a subordinate card;
   (C) setting a new period of the periodic location update of the main card and a new period of the periodic location update of the subordinate card, wherein the new period of the periodic location update of the main card is less than the original period of the periodic location update of the main card, and the original period of the periodic location update of the main card minus the new period of the periodic location update of the main card is no less than twice of a time for a mobile phone to do a location update, wherein the new period of the periodic location update of the subordinate card is less than the original period of the periodic location update of the subordinate card, and the original period of the periodic location update of the subordinate card minus the new period of the periodic location update of the subordinate card is no less than twice of a time for the mobile phone to do the location update; and
   (D) after the step (C), processing the services according to the priority level of the services if there are any service conflicts, or processing the services according to a principle of first come first serve implementation if there are not any service conflicts.

2. The method, as recited in claim 1, wherein the priority level from high to low is listed as follows in turn: a terminating call, a routing area update after cell reselection, a periodic routing area update, and an originating call.

3. The method, as recited in claim 1, wherein when the terminating call conflicts with the location update after cell reselection, process the terminating call firstly, buffer the location update and process the location update until the terminating call ends.

4. The method, as recited in claim 1, wherein when the terminating call conflicts with the periodic location update, process the terminating call firstly, because a period adjustment of the periodic location update can assure the update processed in time.

5. The method, as recited in claim 1, wherein when the location update after cell reselection conflicts with the periodic location update, process the location update after cell reselection firstly and then the periodic location update.

6. The method, as recited in claim 1, wherein when the location update after cell reselection conflicts with the originating call, process the location updated firstly, buffer a request of the originating call, and originate a random access request until the location update ends.

7. The method, as recited in claim 1, wherein when the periodic location update conflicts with the originating call, process the location update firstly, buffer a request of the originating call, and originate a random access request until the location update ends.

* * * * *